(12) United States Patent
Tseng et al.

(10) Patent No.: US 11,506,899 B2
(45) Date of Patent: Nov. 22, 2022

(54) HOLOGRAPHIC DISPLAY DEVICE WITH COLOR-SHIFTED ADJUSTMENT

(71) Applicant: HON HAI PRECISION INDUSTRY CO., LTD., New Taipei (TW)

(72) Inventors: Te-En Tseng, New Taipei (TW); Tsai-Yi Chien, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 303 days.

(21) Appl. No.: 17/021,227

(22) Filed: Sep. 15, 2020

(65) Prior Publication Data
US 2021/0397002 A1 Dec. 23, 2021

(30) Foreign Application Priority Data
Jun. 22, 2020 (CN) .......... 202010578308.X

(51) Int. Cl.
G02B 27/01 (2006.01)
G03H 1/30 (2006.01)
F21V 8/00 (2006.01)

(52) U.S. Cl.
CPC ......... *G02B 27/0172* (2013.01); *G02B 6/005* (2013.01); *G02B 6/0026* (2013.01); *G03H 1/30* (2013.01); *G02B 2027/0112* (2013.01); *G02B 2027/0174* (2013.01)

(58) Field of Classification Search
CPC .. G02B 27/0172; G02B 6/0026; G02B 6/005; G02B 2027/0112; G02B 2027/0174; G03H 1/30
See application file for complete search history.

(56) References Cited

U.S. PATENT DOCUMENTS

2006/0221448 A1 10/2006 Nivon et al.
2018/0052501 A1* 2/2018 Jones, Jr. ................ G06F 3/013

FOREIGN PATENT DOCUMENTS

| CN | 101151562 A | 3/2008 |
| CN | 104614869 A | 5/2015 |
| CN | 104777535 A | 7/2015 |

* cited by examiner

*Primary Examiner* — Collin X Beatty
(74) *Attorney, Agent, or Firm* — ScienBiziP, P.C.

(57) ABSTRACT

A holographic display device includes a display panel for emitting a first image light and a diffraction component on an optical path of the first image light. The first image light includes first and second colors of light. The diffraction component diffracts the first color light at a first diffraction efficiency and diffracts the second color light at a second diffraction efficiency. The first color light and the second color light after diffraction are mixed together in a second image light for generating holographic images. By emitting the first color light and the second color light in the first image light at the same grayscale value, a ratio of intensities of the first color light and the second color light becomes inversely proportional to a ratio of the first diffraction efficiency and the second diffraction efficiency.

18 Claims, 3 Drawing Sheets

HOLOGRAPHIC DISPLAY DEVICE WITH COLOR-SHIFTED ADJUSTMENT

FIELD

The subject matter herein generally relates to image display, particularly relates to a holographic display device.

BACKGROUND

A holographic display method combines holographic technology and waveguide technology to superimpose a virtual image on an external scene image in a projected manner.

The holographic display method applies in holographic displays. A head-mounted holographic display can be worn on the user's head for displaying three-dimensional holographic images. The holographic images are generated from the diffraction of source lights. The source light includes multiple colors of light. Diffraction efficiencies of the multiple colors of light are different, thereby resulting in a color shift of the holographic images.

Therefore, there is room for improvement in the art.

BRIEF DESCRIPTION OF THE DRAWINGS

Implementations of the present disclosure will now be described, by way of embodiment, with reference to the attached figures.

DETAILED DESCRIPTION

Figure 1:
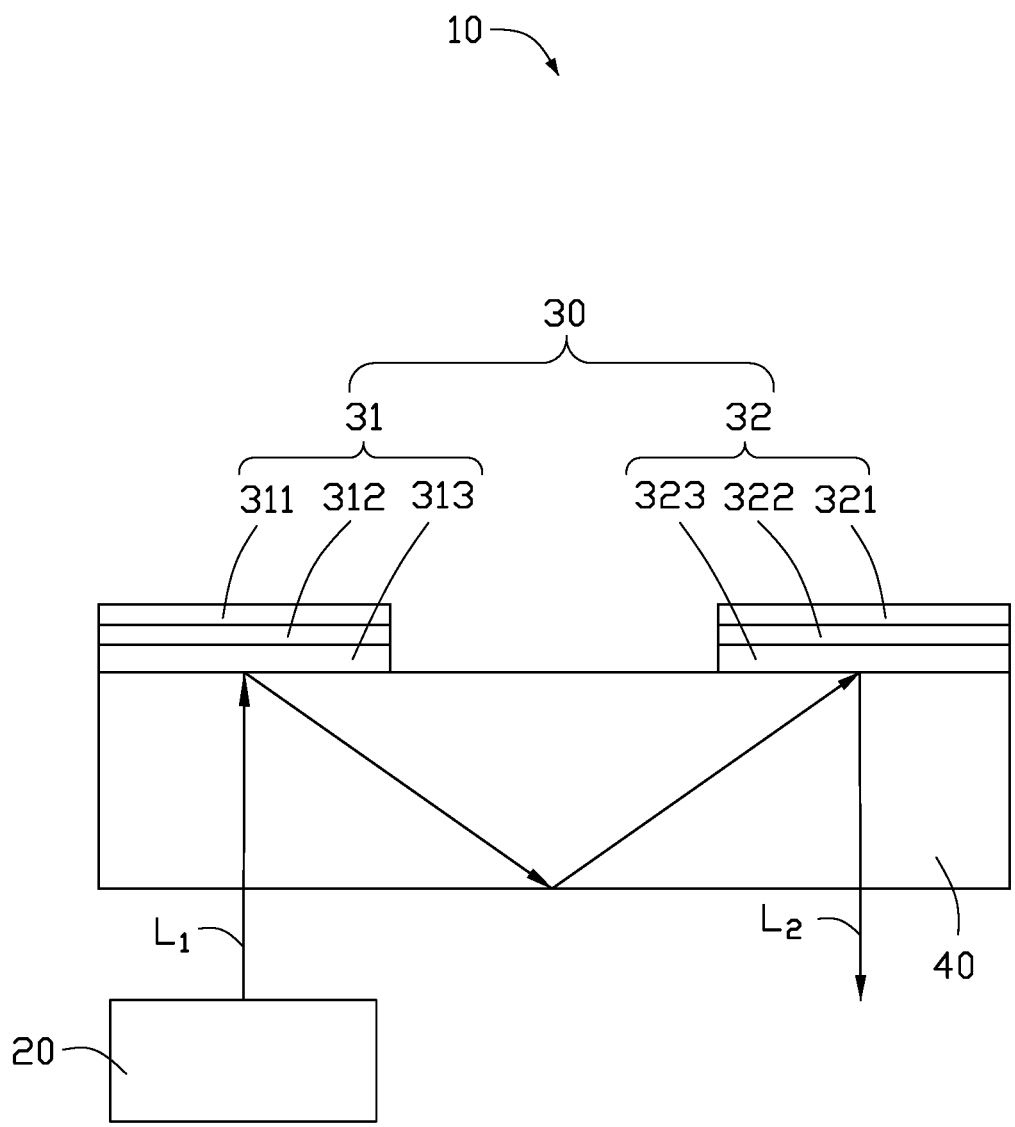
FIG. 1 is a schematic diagram of a holographic display device according to an embodiment of the present disclosure.

It will be appreciated that for simplicity and clarity of illustration, where appropriate, reference numerals have been repeated among different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising" when utilized, means "including, but not necessarily limited to"; it specifically indicates open-ended inclusion or membership in the so-described combination, group, series, and the like.

The present embodiment provides a holographic display device. The holographic display device is a head-mounted holographic display device. The holographic display device can display three-dimensional holographic images. The holographic images can be seen when the holographic display device is worn on a user's head.

FIG. 1 illustrates a holographic display device 10. The holographic display device 10 includes a display panel 20, a diffraction component 30, and an optical waveguide 40 between the display panel 20 and the diffraction component 30.

The display panel 20 is configured to emit a first image light $L_1$ for displaying two-dimensional images. The first image light $L_1$ includes a first color light, a second color light, and a third color light.

The diffraction component 30 is configured to diffract the first image light $L_1$ into a second image light. The second image light still includes the first color light, the second color light, and the third color light.

An optical waveguide 40 is a light propagation medium on an optical path of the first image light $L_1$ The optical waveguide 40 is configured to guide the first image light $L_1$ between the display panel 20 and the diffraction component 30, and guide the second image light $L_2$ out of the diffraction component 30. The optical waveguide 40 may be made of transparent optical glass or optical plastic.

In the present embodiment, the display panel 20 may include a plurality of micro light emitting diodes or Micro organic light emitting diodes for emitting the first image light $L_1$. In other embodiments, the display panel 20 may include the plurality of Micro light emitting diodes or Micro organic light emitting diodes and a color conversion layer (not shown) for converting a part of the first color light into second and third colors of light. The color conversion layer may include a plurality of quantum dots which achieve the converting function.

Figure 2:
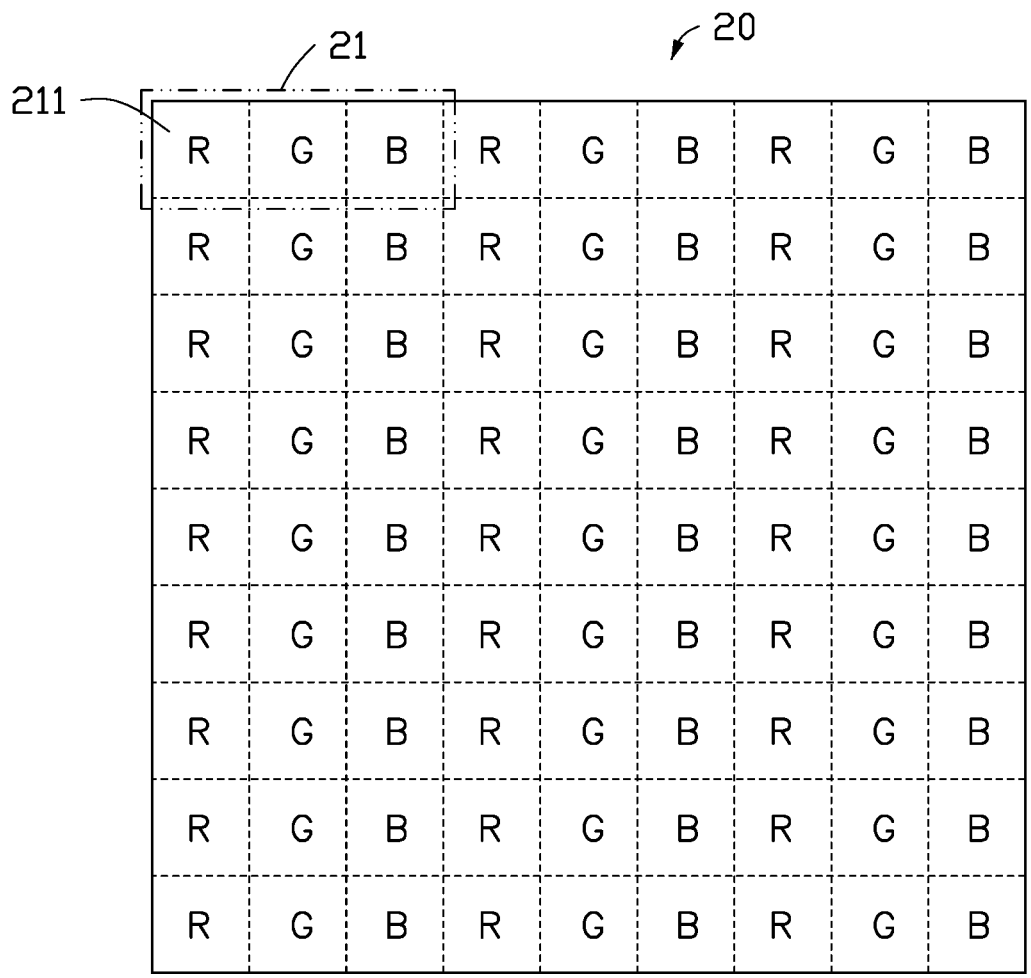
FIG. 2 is a schematic diagram of a distribution of pixel areas in a display panel of FIG. 1.

Referring to FIG. 2, the display panel 20 defines a plurality of pixel regions 21 arranged in an array. Each pixel region 21 includes three sub-pixels 211. The three sub-pixels 211 in each pixel region 21 respectively emit the first color light, the second color light, and the third color light. In the present embodiment, the first color light is red light (R), the second color light is green light (G), and the third color light is blue light (B). The first image light $L_1$ emitted from the display panel 20 is configured for displaying two-dimensional images. The first image light $L_1$ is diffracted by the diffraction component 30 to generate the second image light $L_2$ which generates the holographic images.

Referring to FIG. 1, the diffraction component 30 includes a first diffraction group 31 and a second diffraction group 32 spaced apart from each other. The diffraction component 30 diffracts the first image light $L_1$ twice, the first diffraction group 31 diffracting the first image light $L_1$ a first time, and the second diffraction group 32 diffracting the first image light $L_1$ a second time. The light emitted from the second diffraction group 32 becomes the second image light $L_2$. The optical waveguide 40 guides the first image light $L_1$ and the second image light $L_2$ to propagate in the display panel 20, the first diffraction group 31 and the second diffraction group 32.

The first diffraction group 31 includes a first diffractive element 311 and a third diffractive element 313. A second diffractive element 312 is between the first diffraction element 311 and the third diffraction element 313. In the present embodiment, the first diffraction element 311, the second diffraction element 312, and the third diffraction element 313 are diffraction gratings. In relation to the first image light $L_1$, the first diffraction element 311 diffracts the first color light, the second diffraction element 312 diffracts the second color light, and the third diffraction element 313 diffracts the third color light.

In the present embodiment, while the first diffraction element 311 is mainly configured to diffract the first color light in the first image light $L_1$, the second color light and the third color light in the first image light $L_1$ both pass through the first diffraction element 311. The first diffraction element 311 thus has a diffractive effect on the second color light and the third color light in the first image light $L_1$, although the diffraction effect on the first color light in the first image light $L_1$ is much greater than the diffractive effect on each of the second color light and the third color light in the first image light $L_1$.

Similarly, the second diffraction element 312 is mainly configured to diffract the second color light in the first image light $L_1$, although a diffractive effect is also applied to the first color light and the third color light in the first image light $L_1$. The second diffraction element 312 has a much greater diffractive effect on the second color light in the first image light $L_1$ than on each of the first color light and the third color light in the first image light $L_1$.

The third diffraction element 313 is mainly configured to diffract the third color light in the first image light $L_1$, but diffracts the first color light and the second color light in the first image light $L_1$ as well. A diffraction effect of the third diffraction element 313 on the third color light in the first image light $L_1$ is much greater than the effect on the first color light and the second color light in the first image light $L_1$.

A total diffraction efficiency of the first diffraction element 311, the second diffraction element 312, and the third diffraction element 313 for the first color light in the first image light $L_1$ is defined as a first diffraction efficiency of the first diffraction group 31 for the first color light. A total diffraction efficiency of the first diffraction element 311, the second diffraction element 312, and the third diffraction element 313 for the second color light in the first image light $L_1$ is defined as a second diffraction efficiency of the first diffraction group 31 for the second color light. A total diffraction efficiency of the first diffraction element 311, the second diffraction element 312, and the third diffraction element 313 for the third color light in the first image light $L_1$ is defined as a third diffraction efficiency of the first diffraction group 31 for the third color light.

The first diffraction efficiency of the first diffraction group 31 is expressed as $\eta_{11}$%, the second diffraction efficiency of the first diffraction group 31 is expressed as $\eta_{12}$%, and the third diffraction efficiency of the first diffraction group 31 is expressed as $\eta_{13}$%.

Referring to FIG. 1, the second diffraction group 32 includes a first diffraction element 321, a third diffraction element 323, and a second diffraction element 322 between the first diffraction element 321 and a third diffraction element 323. In the present embodiment, the first diffraction element 321 is used to diffract the first color light emitted from the first diffraction group 31, the second diffraction element 322 is used to diffract the second color light emitted from the first diffraction group 31, and the third diffraction element 323 is used to diffract the third color light emitted from the first diffraction group 31.

In the present embodiment, the first diffraction element 321 is mainly configured to diffract the first color light emitted from the first diffraction group 31. The second color light and the third color light emitted from the first diffraction group 31 both pass through the first diffraction element 321, so the first diffraction element 321 also diffracts the second color light and the third color light emitted from the first diffraction group 31. A diffraction effect of the first diffraction element 321 on the first color light emitted from the first diffraction group 31 is much greater than the effect on each of the second color light and the third color light emitted from the first diffraction group 31.

Similarly, the second diffraction element 322 is mainly configured to diffract the second color light emitted from the first diffraction group 31, but diffracts the first color light and the third color light emitted from the first diffraction group 31 as well. The second diffraction element 322 has a much greater diffraction effect on the second color light emitted from the first diffraction group 31 than on each of the first color light and the third color light emitted from the first diffraction group 31.

The third diffraction element 323 is mainly configured to diffract the third color light emitted from the first diffraction group 31, but diffracts the first color light and the second color light emitted from the first diffraction group 31 as well. A diffraction effect of the third diffraction element 323 on the third color light emitted from the first diffraction group 31 is much greater than the effect on the first color light and the second color light emitted from the first diffraction group 31.

A total diffraction efficiency of the first diffraction element 321, the second diffraction element 322, and the third diffraction element 323 for the first color light emitted from the first diffraction group 31 is defined as a first diffraction efficiency of the second diffraction group 32 for the first color light. A total diffraction efficiency of the first diffraction element 321, the second diffraction element 322, and the third diffraction element 323 for the second color light emitted from the first diffraction group 31 is defined as a second diffraction efficiency of the second diffraction group 32 for the second color light. A total diffraction efficiency of the first diffraction element 321, the second diffraction element 322, and the third diffraction element 323 for the third color light emitted from the first diffraction group 31 is defined as a third diffraction efficiency of the second diffraction group 32 for the third color light.

The first diffraction efficiency of the second diffraction group 32 is expressed as $\eta_{21}$%, the second diffraction efficiency of the second diffraction group 32 is expressed as $\eta_{22}$%, and the third diffraction efficiency of the second diffraction group 32 is expressed as $\eta_{23}$%.

A diffraction efficiency of the diffraction component 30 for the first color light in the first image light $L_1$ is defined as $\eta_1$%, wherein $\eta_1\% = \eta_{11}\% * \eta_{21}\%$. A diffraction efficiency of the diffraction component 30 for the second color light in the first image light $L_1$ is defined as $\eta_2$%, wherein $\eta_2\% = \eta_{12}\% * \eta_{22}\%$. A diffraction efficiency of the diffraction component 30 for the first color light in the first image light $L_1$ is defined as $\eta_3$%, wherein $\eta_3\% = \eta_{13}\% * \eta_{23}\%$.

The respective intensities of the first color light, the second color light, and the third color light emitted from the display panel 20 are different when the holographic display device 10 displays different holographic images. The intensities of the first color light, the second color light, and the third color light are proportional to grayscale values of the first color light, the second color light, and the third color light. That is, the greater the grayscale value, the greater the intensity. So, the intensities of the first color light, the second color light, and the third color light can be changed by changing the grayscale values of the first color light, the second color light, and the third color light emitted from the display panel 20, thereby the holographic display device 10 can display different holographic images.

An intensity of the first color light in the first image light $L_1$ is defined as $A_{11}$, an intensity of the second color light in the first image light $L_1$ is defined as $A_{12}$, and an intensity of the third color light in the first image light $L_1$ is defined as $A_{13}$. An intensity of the first color light in the second image light $L_2$ is defined as $A_{21}$, an intensity of the second color light in the second image light $L_2$ is defined as $A_{22}$, and an intensity of the third color light in the second image light $L_2$ is defined as $A_{23}$. Then $A_{21}=A_{11}\%*\eta_{11}\%*\eta_{21}\%$, $A_{22}=A_{12}\%*\eta_{12}\%*\eta_{22}\%$, $A_{23}=A_{13}*\eta_{13}\%*\eta_{23}\%$.

A ratio of the first color light, the second color light, and the third color light in the first image light $L_1$ emitted from the display panel 20 is defined as a first ratio. A ratio of the first color light, the second color light, and the third color light in the second image light $L_2$ is defined as a second ratio. The first ratio is different from the second ratio since the first diffraction group 31 and the second diffraction group 32 have different diffraction efficiencies for the first color light, the second color light, and the third color light. This causes a color shift in the holographic images displayed by the holographic display device 10, which distorts the holographic images.

In the present embodiment, the problem of color shift is reduced by changing relationships of the intensities and grayscale values of the first color light, the second color light, and the third color light in the first image light $L_1$.

In the present embodiment, the intensities of the first color light, the second color light, and the third color light emitted from the display panel 20 are set to be different when the display panel 20 emits the first color light, the second color light, and the third color light at same grayscale value. When the display panel 20 emits the first color light, the second color light, and the third color light at the same grayscale value, the respective intensities of the first color light, the second color light, and the third color light are set as follows:

$$A_{11}:A_{12}:A_{13}=1/(\eta_1\%):1/(\eta_2\%):1/(\eta_3\%).$$

So that $A_{21}=A_{22}=A_{23}$.

That is, a ratio of the respective intensities of the first color light, the second color light, and the third color light is arranged to be inversely proportional to a ratio of the first diffraction efficiency, the second diffraction efficiency, and the third diffraction efficiency of the diffraction component 30. The result is that the first color light, the second color light, and the third color in the second image light $L_2$ have a same intensity when the display panel 20 emits the first to third color lights at the same grayscale value.

Figure 3:
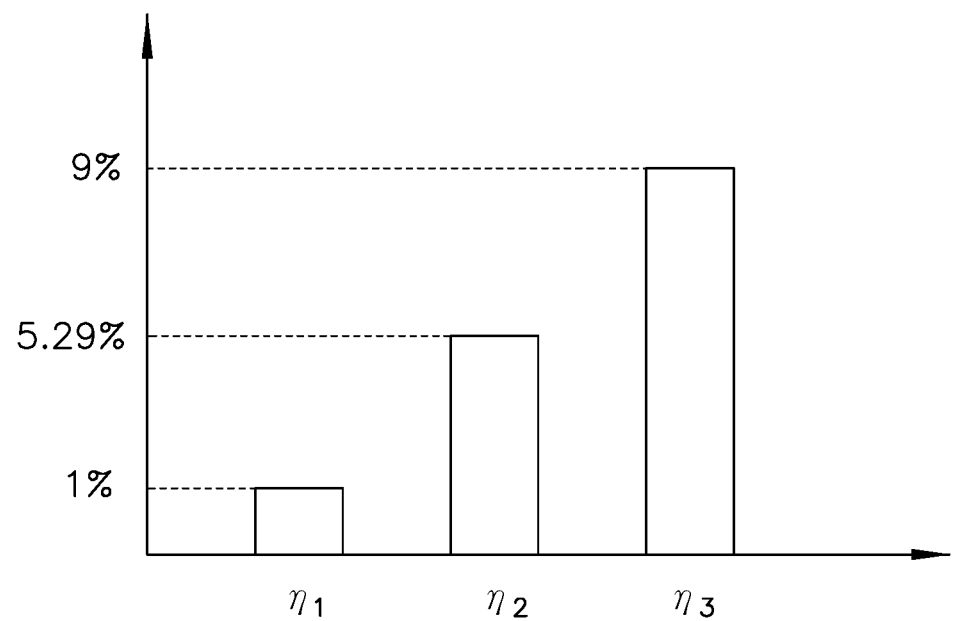
FIG. 3 shows relationships of grayscale values, intensities, and diffraction efficiencies of a first image light emitted from the display panel of FIG. 1.
Figure 3:
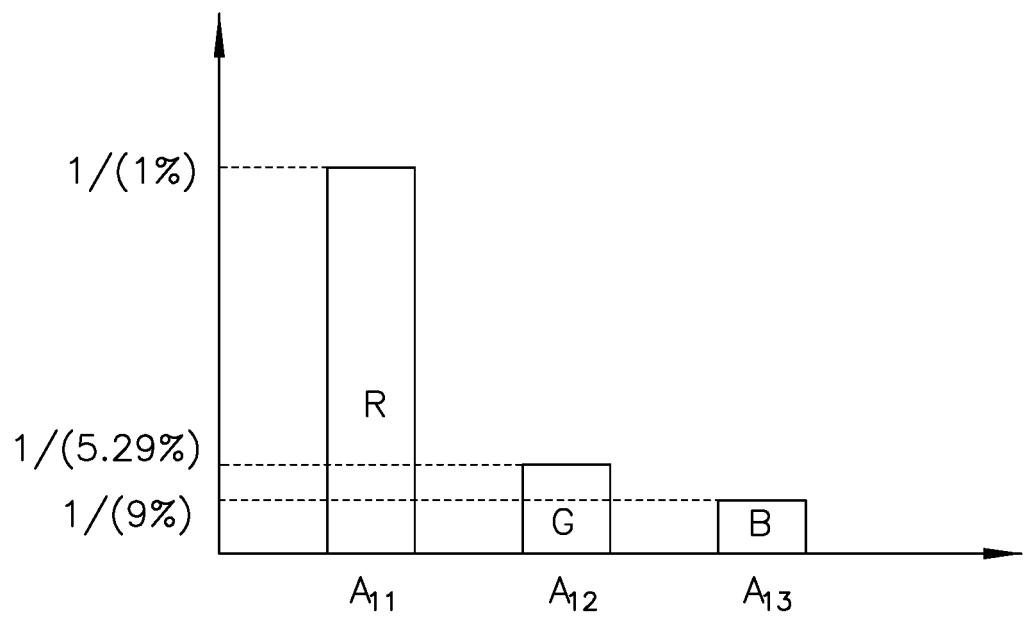

In the present embodiment, $\eta_{11}\%=\eta_{21}\%=10\%$, $\eta_{12}\%=\eta_{22}\%=23\%$, and $\eta_{13}\%=\eta_{23}\%=30\%$. Further, $\eta_1\%=\eta_{11}\%*\eta_{21}\%=1\%$, $\eta_2\%=\eta_{12}\%*\eta_{22}\%=5.29\%$, and $\eta_3\%=\eta_{13}\%*\eta_{23}\%=9\%$. The display panel 20 works in a 24-bit format. Referring to FIG. 3, when the display panel 20 emits the first color light (R), the second color light (G), and the third color light (B) at the same grayscale value 255, the ratio of intensities of the first color light, the second color light and the third color light is set as:

$$A_{11}:A_{12}:A_{13}=1/(\eta_1\%):1/(\eta_2\%):1/(\eta_3\%)=1/(1\%):1/(5.29\%):1/(9\%).$$

So that: $A_{21}=A_{22}=A_{23}$.

In the holographic display device 10 provided in this embodiment, the diffraction component 30 diffracts the first color light, the second color light and the third color light emitted from the display panel 20 at different efficiencies, causing the color shift problem. The problem of color shift is reduced by setting intensities of the first color light, the second color light, and the third color light in the second image light $L_2$ to be the same when the display panel 20 emits the first color light, the second color light, and the third color light at same grayscale value.

It is to be understood, even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present embodiments to the full extent indicated by the plain meaning of the terms in which the appended claims are expressed.

What is claimed is:

1. A holographic display device comprising:
   a display panel for emitting a first image light comprising a first color light and a second color light; and
   a diffraction component on an optical path of the first image light, the diffraction component configured for diffracting the first color light at a first diffraction efficiency and diffracting the second color light at a second diffraction efficiency, the first diffraction efficiency being different from the second diffraction efficiency, the first color light and the second color light diffracted by the diffraction component being mixed to be a second image light for generating holographic images;
   wherein a ratio of intensity of the first color light to intensity of the second color light in the first image light is inversely proportional to a ratio of the first diffraction efficiency to the second diffraction efficiency if the first color light and the second color light in the first image light is emitted at a same grayscale value, such that the first color light and the second color light in the second image light have a same intensity.

2. The holographic display device of claim 1, wherein the diffraction component comprises at least a first diffraction element for diffracting at least one of the first color light and the second color light in the first image light.

3. The holographic display device of claim 2, wherein each of the first image light and the second image light further comprise a third color light, the diffraction component is further configured for diffracting the third color light at a third diffraction efficiency.

4. The holographic display device of claim 3, wherein the diffraction component further comprises a second diffraction element and a third diffraction element;
   the first diffraction element is configured for diffracting the first color light in the first image light, the second diffraction element is configured for diffracting the second color light in the first image light, and the third diffraction element is configured for diffracting the third color light in the first image light.

5. The holographic display device of claim 4, wherein the second diffraction element is between the first diffraction element and the third diffraction element.

6. The holographic display device of claim 4, wherein the diffraction component comprises a first diffraction group and a second diffraction group; the first diffraction group comprises one first diffraction element, one second diffraction element, and one third diffraction element; the second diffraction group comprises one first diffraction element, one second diffraction element, and one third diffraction element.

7. The holographic display device of claim 6, wherein stacking orders of the first diffraction element, the second diffraction element, and the third diffraction element in both the first diffraction group and the second diffraction group are the same.

8. The holographic display device of claim 4, wherein each of the first diffraction element, the second diffraction element, and the third diffraction element is a grating.

9. The holographic display device of claim 4, wherein the first color light is red light, the second color light is green light, and the third color light is blue light.

10. The holographic display device of claim 1, further comprising an optical waveguide between the display panel and the diffraction component, wherein the optical waveguide is configured for guiding the first color light and the second color light to propagate between the display panel and the diffraction component.

11. A holographic display device comprising:
a display panel for emitting a first image light for displaying two-dimensional images, the first image light comprising a first color light and a second color light; and
a diffraction component on an optical path of the first image light, the diffraction component configured for diffracting the first color light at a first diffraction efficiency and diffracting the second color light at a second diffraction efficiency, the first diffraction efficiency being different from the second diffraction efficiency, the first color light and the second color light diffracted by the diffraction component being mixed to be a second image light for generating holographic images;
wherein a ratio of intensity of the first color light to intensity of the second color light in the first image light is inversely proportional to a ratio of the first diffraction efficiency to the second diffraction efficiency if the first color light and the second color light in the first image light is emitted at a same grayscale value, such that the first color light and the second color light in the second image light have a same intensity.

12. The holographic display device of claim 11, wherein the diffraction component comprises at least a first diffraction element for diffracting at least one of the first color light and the second color light in the first image light.

13. The holographic display device of claim 12, wherein each of the first image light and the second image light further comprise a third color light, the diffraction component is further configured for diffracting the third color light at a third diffraction efficiency.

14. The holographic display device of claim 13, wherein the diffraction component further comprises a second diffraction element and a third diffraction element;
wherein the first diffraction element is configured for diffracting the first color light in the first image light, the second diffraction element is configured for diffracting the second color light in the first image light, and the third diffraction element is configured for diffracting the third color light in the first image light.

15. The holographic display device of claim 14, wherein the second diffraction element is between the first diffraction element and the third diffraction element.

16. The holographic display device of claim 14, wherein the diffraction component comprises a first diffraction group and a second diffraction group; the first diffraction group comprises one first diffraction element, one second diffraction element, and one third diffraction element; the second diffraction group comprises one first diffraction element, one second diffraction element, and one third diffraction element.

17. The holographic display device of claim 14, wherein each of the first diffraction element, the second diffraction element, and the third diffraction element is a grating.

18. The holographic display device of claim 11, further comprising an optical waveguide between the display panel and the diffraction component, wherein the optical waveguide is configured for guiding the first color light and the second color light to propagate between the display panel and the diffraction component.

* * * * *